United States Patent
Takano

(10) Patent No.: US 8,717,586 B2
(45) Date of Patent: May 6, 2014

(54) IMAGE PROCESSING APPARATUS THAT PERFORMS PROCESSING ACCORDING TO INSTRUCTION DEFINING THE PROCESSING, CONTROL METHOD FOR THE APPARATUS, AND STORAGE MEDIUM

(75) Inventor: Shinichi Takano, Yokohama (JP)

(73) Assignee: Canon Kabushiki Kaisha (JP)

( * ) Notice: Subject to any disclaimer, the term of this patent is extended or adjusted under 35 U.S.C. 154(b) by 232 days.

(21) Appl. No.: 13/149,308

(22) Filed: May 31, 2011

(65) Prior Publication Data
US 2011/0302396 A1 Dec. 8, 2011

(30) Foreign Application Priority Data
Jun. 7, 2010 (JP) ................................. 2010-129933

(51) Int. Cl.
*G06F 3/12* (2006.01)
(52) U.S. Cl.
USPC ......... 358/1.13; 358/1.9; 358/1.15; 358/1.16; 712/226; 712/220; 712/209
(58) Field of Classification Search
CPC ................................................ H04N 1/00949
See application file for complete search history.

(56) References Cited

U.S. PATENT DOCUMENTS

| | | | |
|---|---|---|---|
| 6,594,039 B1* | 7/2003 | Kanbayashi | 358/491 |
| 8,049,910 B2* | 11/2011 | Beckman et al. | 358/1.13 |
| 2006/0061788 A1* | 3/2006 | Takano | 358/1.13 |
| 2007/0165028 A1* | 7/2007 | Hsu | 345/426 |
| 2007/0188824 A1* | 8/2007 | Imamichi | 358/448 |
| 2008/0068640 A1* | 3/2008 | Todaka | 358/1.14 |
| 2008/0086542 A1* | 4/2008 | Mukherjee et al. | 709/219 |
| 2010/0110485 A1* | 5/2010 | Watariuchi | 358/1.15 |
| 2010/0110486 A1* | 5/2010 | Takano | 358/1.15 |
| 2013/0176586 A1* | 7/2013 | Takano | 358/1.13 |

FOREIGN PATENT DOCUMENTS

JP   2004-287860   10/2004

\* cited by examiner

*Primary Examiner* — Miya J Cato
(74) *Attorney, Agent, or Firm* — Rossi, Kimms & McDowell LLP

(57) ABSTRACT

An image processing apparatus which makes it possible to select a plurality of instructions at a time, and connect a plurality of documents together so that they can be processed as one document. The image processing apparatus has a reading unit, which reads an image on an original to generate image data, and performs processing according to an instruction defining reading processing to be performed, as well as processing on the generated image data. The selected plurality of instructions are analyzed, and based on the analysis result, the selected plurality of instructions are connected together to create a new instruction.

10 Claims, 12 Drawing Sheets

FIG.3

```xml
<?xml version="1.0" encoding="UTF-8" ?>
<Process id="0001" caption="REGISTER AS SEARCHABLE PDF IN DOCUMENT MANAGEMENT SERVER">
  <Scan>
    <Setting type="color">
      FULL_COLOR
    </Setting>
    <Setting>...</Setting>
  </Scan>
  <ImageProcessing type="searchable PDF">
  </ImageProcessing>
  <Send type="send">
    <Setting type="address">
      ¥¥AAA.BBB.CCC
    </Setting>
    <Setting>...</Setting>
  </Send>
</Process>
```

410

501 — `<?xml version="1.0" encoding="UTF-8" ?>`
502 — `<Process id="0001" caption="REGISTER AS SEARCHABLE PDF IN DOCUMENT MANAGEMENT SERVER">`
503 — `<Setting type="color">`
504 — `<ImageProcessing type="searchable PDF">`
505 — `<Setting type="address">`

FIG.7

```
901 — <?xml version="1.0" encoding="UTF-8" ?>
902 — <Main Process id="1001" >
      <Process id="0001" >
         <Scan>
            <Setting type="color">
               FULL_COLOR
            </Setting>
            <Setting>···</Setting>
914 —    </Scan>
         <ImageProcessing type=" searchable PDF">
905 —    </ImageProcessing>
         <Storage>
908 —       <Setting>···</Setting>
            <Image Name>img1_xxx</Image Name>
909 —    </Storage>
         <Complete>false</Complete>
903 — </Process>
      <Process id="0002" >
         <Scan>
            <Setting type="color">
               FULL_COLOR
            </Setting>
            <Setting>···</Setting>
915 —    </Scan>
         <ImageProcessing type="High compression PDF">
906 —    </ImageProcessing>
         <Storage>
            <Setting>···</Setting>
            <Image Name>img2_yyy</Image Name>
910 —    </Storage>
         <Complete>false</Complete>
904 — </Process>
      <Process id="0003" >
         <Scan>
            <Setting type="color">
               Black and White
            </Setting>
            <Setting>···</Setting>
916 —    </Scan>
         <ImageProcessing type="PDF">
907 —    </ImageProcessing>
         <Storage>
            <Setting>···</Setting>
911 —    </Storage>
         <Complete>false</Complete>
912 — </Process>
      <Connect Image>
      ...
913 — </Connect Image>
      <Send type="send">
         <Setting type="address">
            ¥¥AAA.BBB.CCC
         </Setting>
         <Setting>···</Setting>
      </Send>
      </Main Process>
```

IMAGE PROCESSING APPARATUS THAT PERFORMS PROCESSING ACCORDING TO INSTRUCTION DEFINING THE PROCESSING, CONTROL METHOD FOR THE APPARATUS, AND STORAGE MEDIUM

BACKGROUND OF THE INVENTION

1. Field of the Invention

The present invention relates to an image processing apparatus that performs processing such as reading processing according to an instruction defining the processing, a control method for the image processing apparatus, and a computer-readable storage medium storing a program for implementing the control method.

2. Description of the Related Art

In recent years, there has been known an image processing apparatus which has a reading function of reading an image on an original to generate image data, and a processing function of performing processing such as transmission on the generated image data. A user who uses such an apparatus specifies reading parameters for use in reading an image on an original, and specifies information regarding processing on the generated image data (a transmission protocol, a transmission destination, and so on if the image data is transmitted). Then, in accordance with the information specified by the user, the image processing apparatus reads an image on an original to generate image data, and processes the generated image data.

When a series of processes are to be performed using a plurality of functions in combination as above, a large number of things should be specified by the user in many cases, which requires complicated operations.

To address this problem, it is described in Japanese Laid-Open Patent Publication (Kokai) No. 2004-287860 that, when a plurality of services are to be provided in combination, an instruction defining a plurality of processes that should be performed is created in advance, and a document is processed in accordance with definitions described in the instruction. According to the method described in Japanese Laid-Open Patent Publication (Kokai) No. 2004-287860, simply by a user instructing execution of an instruction prepared in advance, processes described in the instruction are performed in succession, which can reduce user operations.

Conventionally, when an instruction as described in Japanese Laid-Open Patent Publication (Kokai) No. 2004-287860 is to be executed, it is possible to select only one instruction and instruct execution of the selected one instruction. In other words, conventionally, selection of only one instruction is accepted, and when execution of the selected one instruction is instructed, processes are performed according to definitions described in the selected one instruction.

However, in the case where only one instruction can be selected as above, a problem explained hereafter may arise. There may be a case where a user wants to perform processes described in different instructions on a plurality of documents, and then connect the documents together so that they can be processed as one document. In such a case, according to the prior art, when one instruction is selected, processing is performed to the end in accordance with the instruction, and hence even if a plurality of instructions are selected so as to connect documents together, they are simply processed as respective different documents to the end. Namely, a plurality of documents cannot be connected together and processed as one document.

A description will be given of this point with a concrete example. Assume a case where a user wants to subject image data obtained by reading a certain original to a process A and a process B, and then register the image data in a server. Conventionally, in such a case, there is assumed a case where there are only an instruction A defining that the read image data is subjected to the process A and registered in the server, and an instruction B defining that the read image data is subjected to the process B and registered in the server. In this case, there is no option but to register the image data subjected to only the process A, or to register the image data subjected to only the process B.

SUMMARY OF THE INVENTION

The present invention provides an image processing apparatus and a control method therefor, which make it possible to select a plurality of instructions at a time, and connect a plurality of documents together so that they can be processed as one document, as well as a computer-readable storage medium storing a program for causing a computer to implement the control method.

Accordingly, a first aspect of the present invention provides an image processing apparatus that has a reading unit reading an image on an original to generate image data based on the image, and performs processing according to an instruction defining reading processing that should be performed by the reading unit and processing on the image data generated by the reading unit, comprising a selection unit configured to select a plurality of instructions, an analysis unit configured to analyze the selected plurality of instructions, and a connection unit configured to, based on a result of the analysis by the analysis unit, connect the selected plurality of instructions together to create a new instruction.

Accordingly, a second aspect of the present invention provides a control method for an image processing apparatus that has a reading unit reading an image on an original to generate image data based on the image, and performs processing according to an instruction defining reading processing that should be performed by the reading unit and processing on the image data generated by the reading unit, comprising a selection step of selecting a plurality of instructions, an analysis step of analyzing the selected plurality of instructions, and a connection step of, based on a result of the analysis in the analysis step, connecting the selected plurality of instructions together to create a new instruction.

Accordingly, a third aspect of the present invention provides a non-transitory computer-readable storage medium storing a program for implementing a control method for an image processing apparatus that has a reading unit reading an image on an original to generate image data based on the image, and performs processing according to an instruction defining reading processing that should be performed by the reading unit and processing on the image data generated by the reading unit, the control method comprising a selection step of selecting a plurality of instructions, an analysis step of analyzing the selected plurality of instructions, and a connection step of, based on a result of the analysis in the analysis step, connecting the selected plurality of instructions together to create a new instruction.

According to the present invention, because a plurality of instructions can be selected at a time, and a plurality of documents can be connected together and processed as one document.

Further features of the present invention will become apparent from the following description of exemplary embodiments (with reference to the attached drawings).

BRIEF DESCRIPTION OF THE DRAWINGS

FIG. 3 is a diagram schematically showing exemplary descriptions of a process definition file.

FIG. 7 is a diagram schematically showing exemplary descriptions of a process definition file for the connecting procedure.

DESCRIPTION OF THE EMBODIMENTS

The present invention will now be described in detail with reference to the drawings showing embodiments thereof.

First, a description will be given of a first embodiment of the present invention.

Figure 1A:
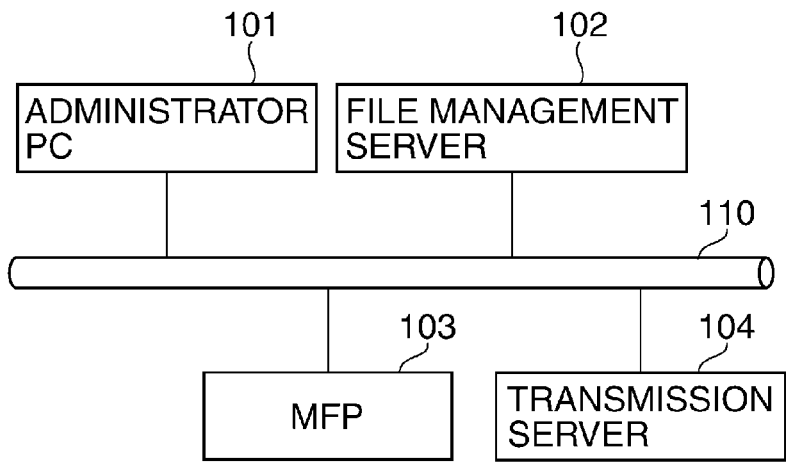
FIGS. 1A and 1B are diagrams showing an arrangement of an image processing system according to a first embodiment.

FIG. 1A is a block diagram schematically showing an overall arrangement of an image processing system according to the first embodiment of the present invention.

The image processing system is comprised of an administrator PC 101, a file management server 102, an MFP 103, and a transmission server 104, which are connected for communication with each other via a LAN 110.

The administrator PC 101 displays a screen for creating a process definition file (an instruction) defining reading processing to be performed by the MFP 103, and processing on image data generated by the MFP 103. A user can create a process definition file by inputting various information on processing via the displayed process definition file creating screen.

The file management server 102 registers the created process definition file in association with a user ID, and holds the same. The MFP 103 has a plurality of functions such as a scanner function and a printer function, and performs processing based on the process definition file.

An electronic mail server, an FTP server, and so on (not shown) are also provided on the LAN 101, so that the transmission server 104 can transmit and receive electronic mails to and from them, and transmit and receive image data using FTP protocol.

Figure 1B:
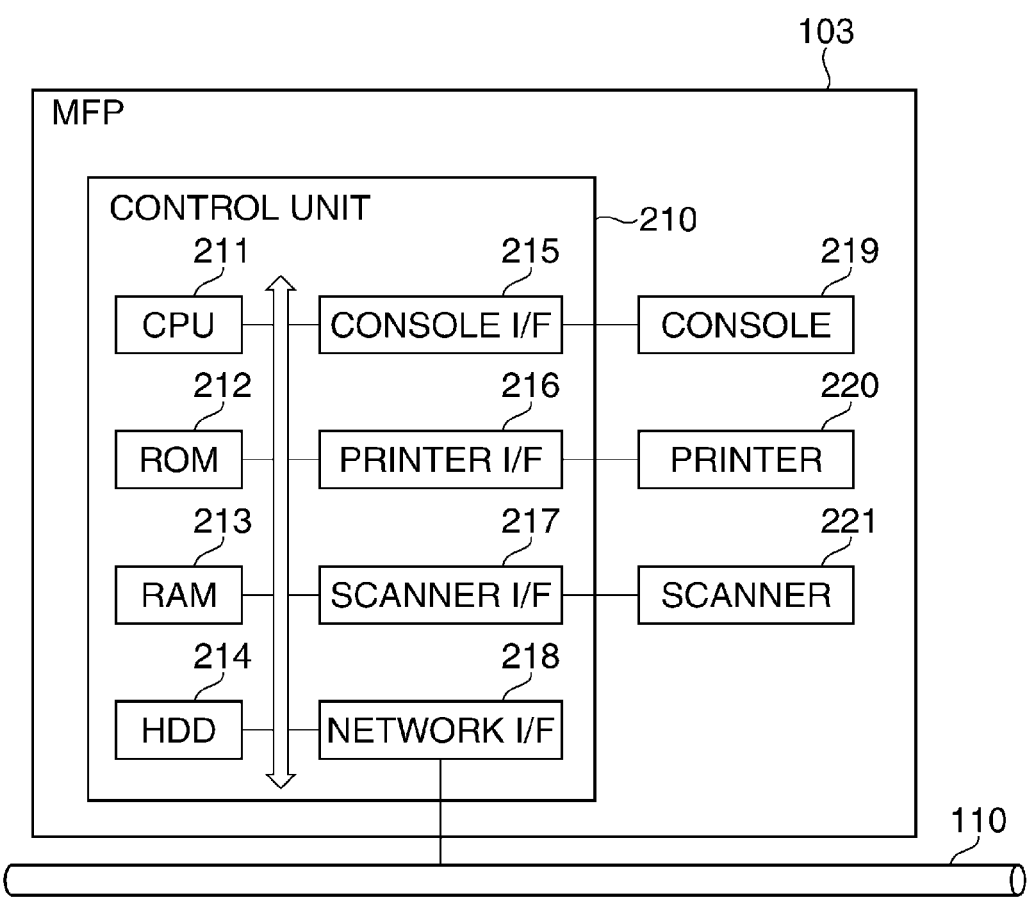

FIG. 1B is a block diagram schematically showing an arrangement of the MFP 103.

A control unit 210 including a CPU 211 controls the overall operation of the MFP 103. The CPU 211 reads out control programs stored in a ROM 212, and performs various types of control processing such as reading control processing and transmission control processing. A RAM 213 is used as a temporary storage area such as a main memory, a work area, and so on for the CPU 211. An HDD 214 stores image data and various programs, or various information tables, to be describer later.

A console I/F 215 connects a console 219 and the control unit 210 to each other. The console 219 has a liquid crystal display with a touch panel function, a keyboard, and so on.

A printer I/F 216 connects a printer 220 and the control unit 210 to each other. Image data to be printed by the printer 220 is transferred from the control unit 210 to the printer 220 via the printer I/F 216, and printed on a recording medium by the printer 220.

A scanner I/F 217 connects a scanner 221 (reading unit) and the control unit 210 to each other. The scanner 221 reads an image on an original to generate image data, and inputs the image to the control unit 210 via the scanner I/F 217.

A network I/F 218 connects the control unit 210 (the MFP 103) to the LAN 110. The network I/F 218 transmits image data to an external device (for example, the transmission server 104) on the LAN 110, and receives various information from an external device (for example, the transmission server 104) on the LAN 110.

Figure 2A:
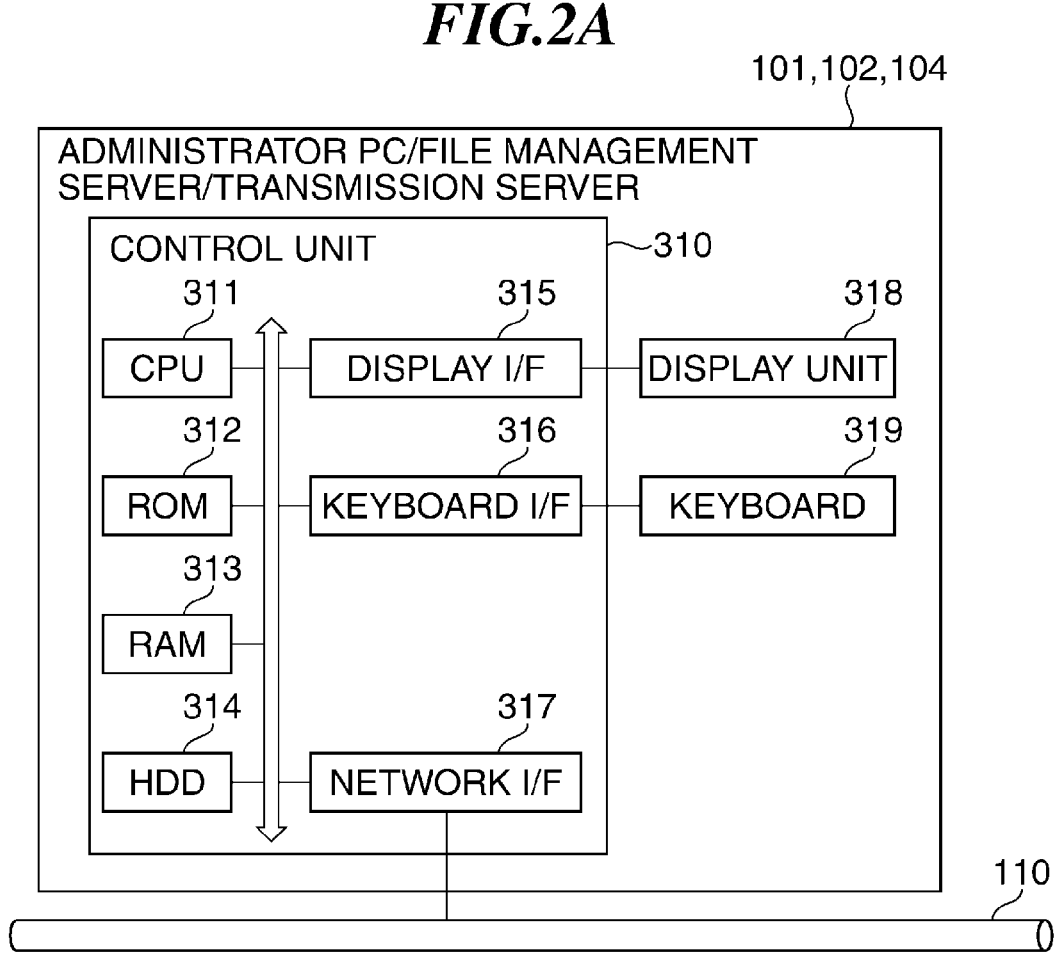
FIGS. 2A and 2B are diagrams schematically showing an arrangement and operations according to the present embodiment.

FIG. 2A is a block diagram schematically showing an arrangement of the administrator PC 101.

It should be noted that the file management server 102 and the transmission server 104 are equivalent in arrangement to the administrator PC 101, and hence they will now be described together.

A control unit 310 including a CPU 311 controls the overall operation of the administrator PC 101. The CPU 311 reads out control programs stored in a ROM 312, and carries out various types of control processing. A RAM 313 is used as a temporary storage area as a main memory, a work area, and so on for the CPU 311. An HDD 314 stores image data and various programs, or various information tables, to be describer later.

A display I/F 315 connects a display 318 and the control unit 310 to each other. A keyboard I/F 316 connects a keyboard 319 and the control unit 310 to each other. The CPU 311 recognizes instructions from the user via the keyboard I/F 316, and changes screens to be displayed on the display 318 in accordance with the recognized instructions.

A network I/F 317 connects the control unit 3 (the administrator PC 101) to the LAN 110. The network I/F 317 transmits and receives various information to and from other devices on the LAN 110.

Figure 2B:
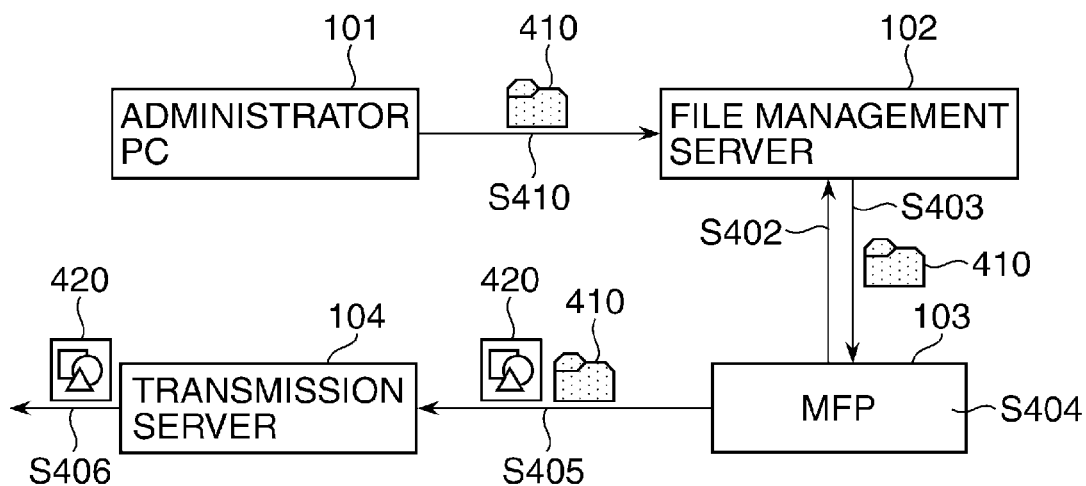

Next, a conceptual description will be given of how the image processing system arranged as described above operates. FIG. 2B is a schematic diagram useful in conceptually explaining how the entire image processing system operates according to the present embodiment.

In the following description of the first embodiment, it is assumed that, for example, the MFP 103 performs processing based on a plurality of process definition files, connects a plurality of documents together into one, and transmits one resultant image to the transmission server 104, which in turn performs post-processing.

First, the user operates the administrator PC 101 to create a process definition file 410. The process definition file 410 describes definitions for performing a series of processes using a plurality of functions which the MFP 103 and the transmission server 104 have. In the present embodiment, it is assumed that the process definition file 410 defines a series of processes in which the MFP 103 reads an image on an original to generate image data, and the generated image data is transmitted from the transmission server 104 to a predetermined destination.

The user inputs various information on the processes (such as reading parameters and a transmission destination) via the process definition file creating screen displayed on the administrator PC 101. When the creation of the process definition file 410 is completed, the created process definition file 410 is transmitted to the file management server 102 via the LAN 110 (step S401).

Upon receiving the process definition file 410, the file management server 102 registers the received process definition file 410 in association with a user ID, and holds the same. Thereafter, when a user logs in to the MFP 103, the MFP 103 transmits, to the file management server 102, a user ID corresponding to the user who has logged in, and requests a process definition file associated with the user who has logged in (step S402).

Upon receiving the request for the process definition file, the file management server 102 reads out the process definition file 410 associated with the received user ID, and transmits the process definition file 410 to the MFP 103 via the LAN 110 (step S403).

Upon obtaining the process definition file 410 from the file management server 102, the MFP 103 presents the obtained process definition file 410 to a user, and accepts the selection of the process definition file 410 from the user. Further, the MFP 103 causes the scanner 221 to perform reading processing based on the definitions described in the selected process definition file 410, and generates image data according to the definitions described in the selected process definition file 410 (step S404).

Then, the MFP 103 transmits the generated image data 420 and the process definition file 410 to the transmission server 104, and requests the transmission server 104 to transmit the image data (step S405). In accordance with the definitions described in the selected process definition file 410, the transmission server 104 transmits the image data 420 using an electronic mail, FTP protocol, or the like (step S406).

The arrangement described above eliminates the necessity for the user to perform complicated operations such as designation of reading parameters, a transmission destination, and so on whenever he/she reads an original using the MFP 103. Further, because information specified when a process definition file is created using the administrator PC 101 is not allowed to be changed by the MFP 103, processing unintended by an administrator can be prevented from being performed by the user of the MFP 103.

FIG. 3 is a diagram schematically showing exemplary descriptions of the process definition file 410 registered in the file management server 102.

It should be noted that here the process definition file 410 is described in XML format, but a process definition file may be described in any other format. Processes defined in process definition file are described as XML tags, and the order in which the processes appear in the process definition file represents the order in which the processes are performed.

A tag 501 indicates that a plurality of processes are combined into one process. Specifically, the tag 501 describes a process ID which uniquely identifies a process definition file ("0001" in the example shown in FIG. 3), a process name ("register as searchable PDF in document management server" in the example shown in FIG. 3), and so on.

A tag 502 defines that an image on an original is read using a scanner to generate image data. A tag 503 defines that when the scanner reads the image on the original, full-color image data is generated.

A tag 504 defines information on an image process that is to be performed on the image data. It should be noted that in the example shown in FIG. 3, OCR processing is performed to convert the image data into a character-searchable PDF image format. A tag 505 describes an address that is a destination of the image data ("¥¥AAA.BBB.CCC" in the example shown in FIG. 3). What is written here may be either a host name or an IP address as long as the destination can be known.

Figure 4A:
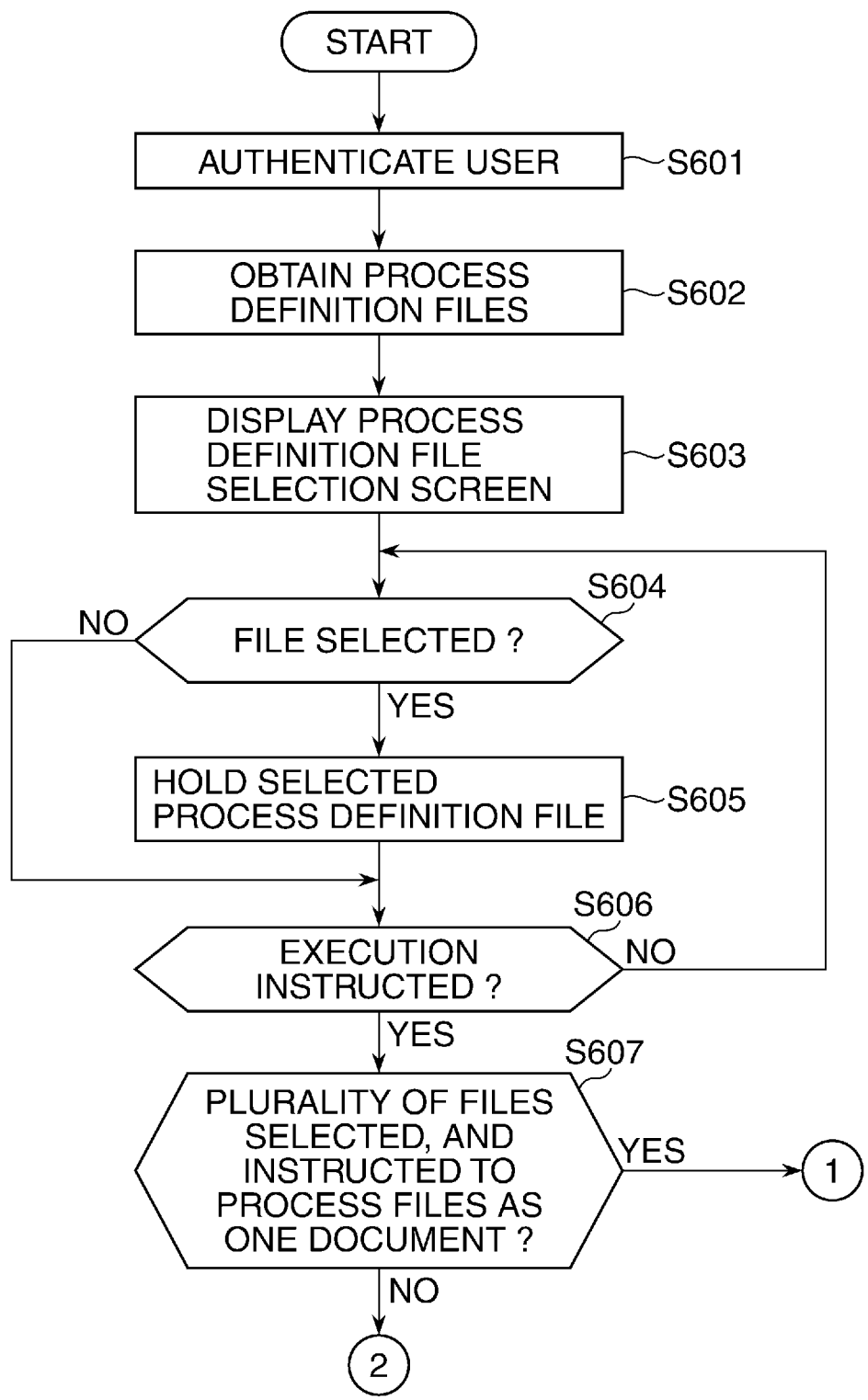
FIGS. 4A and 4B are flowcharts useful in explaining operations performed by an MFP according to the present embodiment.
Figure 4B:
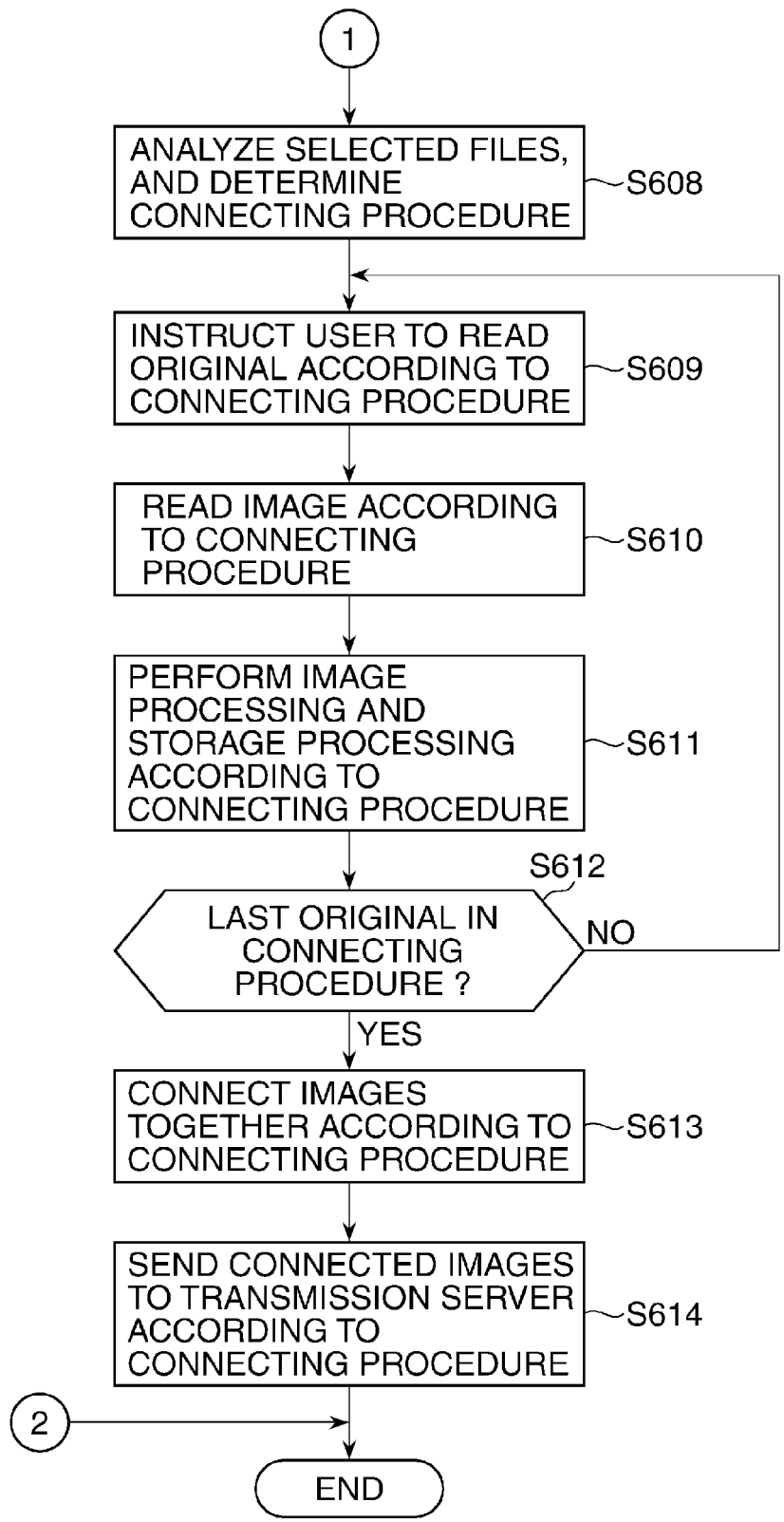

FIGS. 4A and 4B are flowcharts of operatoins performed by the MFP 103 according to the present embodiment, and describe a series of processes in which the MFP 103 generates image data according to a selected process definition file, and requests the transmission server 104 to process the image data. It should be noted that the operations in the flowcharts of FIGS. 4A and 4B are realized by the CPU 211 of the MFP 103 executing control programs.

First, in step S601, the CPU 211 authenticates a user who is operating the MFP 103. Specifically, the CPU 211 displays, on the console 219, an authentication information input screen for inputting authentication information, and authenticates the user by collating the authentication information inputted via the authentication information input screen with authentication information held in advance. It should be noted that the user may be authenticated using any method such as a method in which authentication information is input by reading an ID card, or a method in which authentication is performed using biological information.

When the user has been successfully authenticated, the CPU 211 proceeds to step S602, in which the CPU 211 requests a process definition file from the file management server 102. Specifically, the CPU 211 transmits a user ID of the authenticated user to the file management server 102.

Then, after receiving the process definition file transmitted from the file management server 102, the CPU 211 displays a file selection screen that allows the user to select an arbitrary process definition file (step S603).

Figure 5:
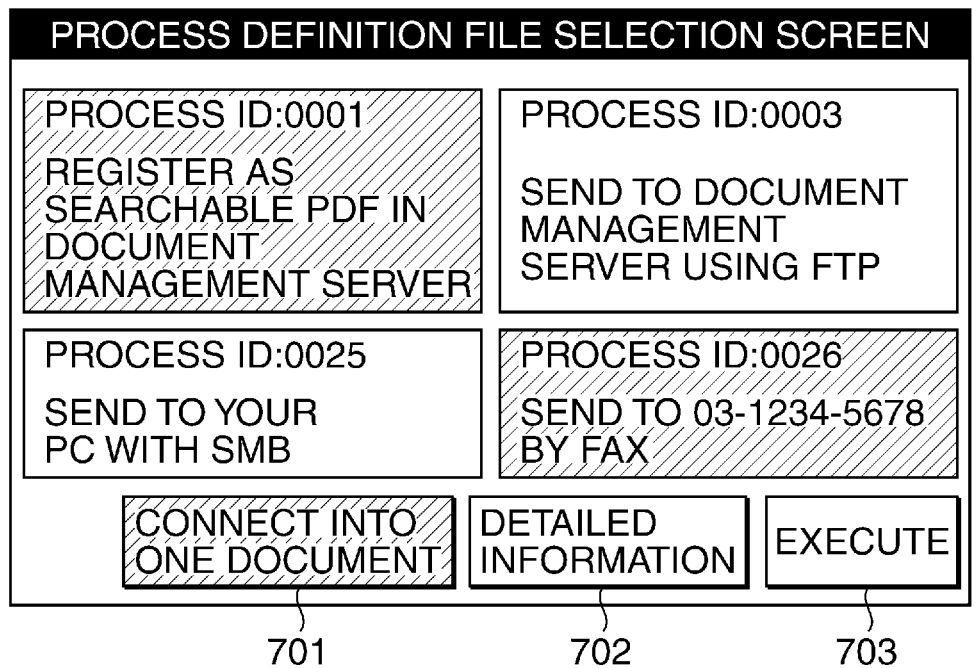
FIG. 5 is a view showing an exemplary screen displayed on the MFP according to the present embodiment.

FIG. 5 is a screen view showing an exemplary definition file selection screen (a selection unit and a selection display unit) that allows the user to select a process definition file.

When obtaining a plurality of process definition files in the step S602, the CPU 211 displays them in list form on the file selection screen as shown in FIG. 5. Based on information displayed on the file selection screen, the user can select a process definition file by touching a display region corresponding to a desired process definition file. When the user selects a process definition file, a display region corresponding to the selected process definition file is highlighted so that the selection can be recognized. In the exemplary screen shown in FIG. 5, a process definition file with a process ID of "0001" and a process definition file with a process ID of "0026" are selected.

A connection-into-one-document button 701 is a button for, when a plurality of process definition files are selected, instructing application of them to each of documents, and connecting their images together so that they can be processed as one document. When the user selects the connection-into-one-document button 701, its display region is highlighted so that the selection of the connection-into-one-document button 701 can be recognized. In the exemplary screen shown in FIG. 5, the connection-into-one-document button 701 is selected.

A detailed information button 702 is a button for displaying detailed information on currently-selected process definition files. When the detailed information button 702 is depressed, detailed information on currently-selected process definition files (for example, concrete definitions of reading processing and transmission processing described in the process definition file) is displayed.

Referring again to the flow in FIG. 4A, in accordance with an instruction from the user via the file selection screen, the CPU 211 determines in the next step S604 whether or not a process definition file has been selected. When it is determined that a process definition file has been selected, the CPU 211 proceeds to step S605, in which the CPU 211 temporarily stores the selected process definition file in a storage region for transmission. It should be noted that information indicative of the selected process definition file, not the substance of the selected process definition file, may be stored in the storage region for transmission.

Next, in step S606, the CPU 211 determines whether or not an execution button 703 appearing in FIG. 5 has been depressed. When the execution button 703 has been depressed, the CPU 211 proceeds to step S607, and when not, the CPU 211 returns to the step S604, in which the CPU 211 determines again whether or not a process definition file has been selected. Namely, the execution button 703 can be depressed with a plurality of process definition files selected at a time. Thus, execution of the selected plurality of process definition files can be collectively instructed. It should be noted that when no process definition file has been selected, the execution button 703 cannot be depressed.

In the step S607, the CPU 211 determines whether or not the user has selected a plurality of process definition files, and issued an instruction to process a plurality of documents as one document. Because in the exemplary screen shown in FIG. 5, the process definition file with the process ID of "0001" and the process definition file with the process ID of "0026" are selected, and the connection-into-one-document button 701 is depressed, the CPU 211 determines the above instruction has been issued. When determining that the above instruction has been issued, the CPU 211 proceeds to step S608.

In the step S608, the CPU 211 analyzes the selected process definition files (an analysis unit), and determines a connecting procedure for processing a plurality of documents as one document (a connection unit and a connection determination unit). Specifically, the CPU 211 determines the order in which the selected plurality of process definition files are to be processed, the number of times reading processing is to be performed, and settings of the reading processing. Further, the CPU 211 determines an instruction to perform image processing on read images, an instruction to perform image storage processing on image data subjected to the image processing, an instruction to perform image connection processing on the stored images, an instruction to perform post-processing (in the present embodiment, processing performed by the transmission server 104) on one document obtained by the image connection processing, and so on.

Figure 6:
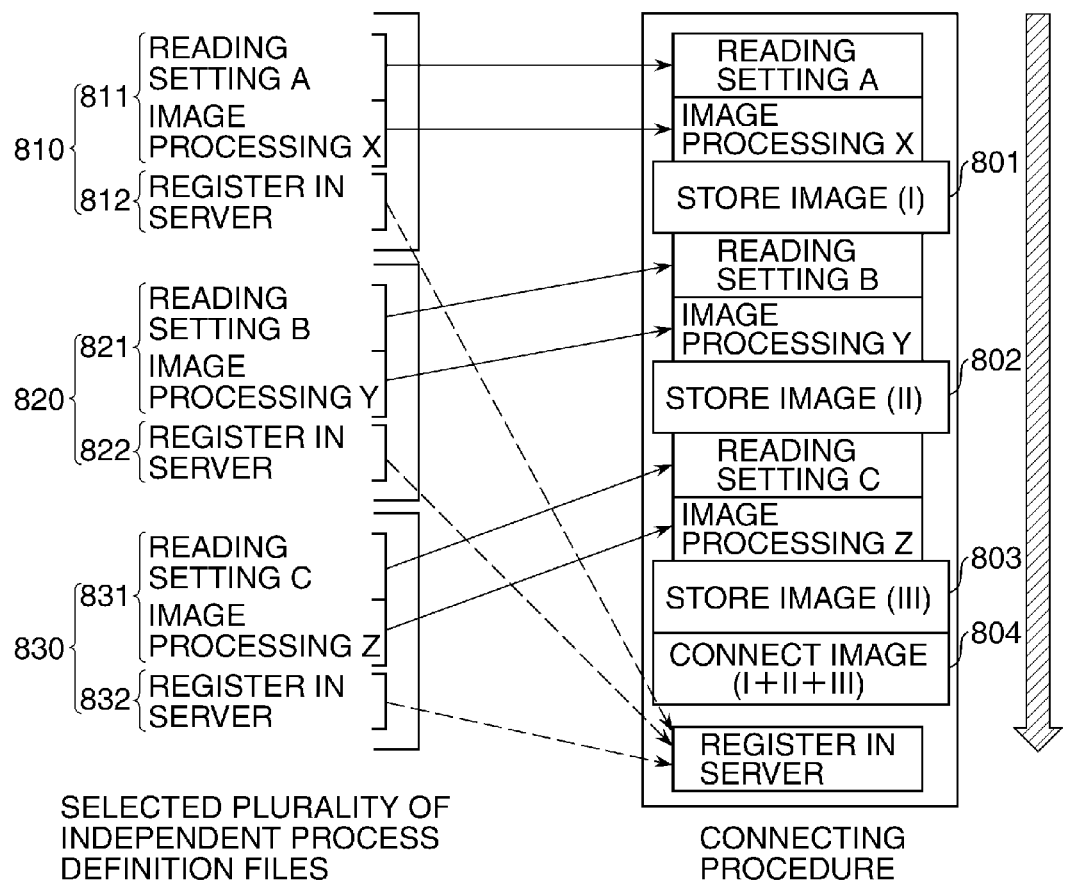
FIG. 6 is a diagram showing an exemplary method to determine a connecting procedure according to the present embodiment.

FIG. 6 is a conceptual diagram showing an exemplary method to determine the connecting procedure according to the present embodiment.

Reference numerals 810, 820, and 830 in FIG. 6 denote selected process definition files.

First, the CPU 211 determines the order in which the selected process definition files are processed, and the number of times the scanner reads an image on an original. Examples of the method to determine the processing order include a method in which the order in which the process definition files have been selected by the user is regarded as the processing order, and a method in which the order specified by the user via the console 219 at the time of execution is regarded as the processing order. In the example shown in FIG. 6, it is determined that the process definition files 810, 820, and 830 are processed in this order. The number of times an image is read is equal to the number of selected process definition files (in the example shown in FIG. 6, the number of times an image is read is three). Namely, image reading processing is performed in the processing order.

Then, the CPU 211 determines settings of image reading processing, and an instruction to perform image processing on a read image. The settings of image reading processing and the instruction to perform image processing on a read image are the same as settings of image reading processing and an instruction to perform image processing on a read image in each process definition file (FIG. 6: 811, 821, and 831, and FIG. 3: 502, 503, and 504).

Then, the CPU 211 determines an instruction to store images that have been subjected to image processing (801, 802, and 803). The instruction is to store images subjected to image processing in such a place as the HDD 314 where they can be stored, and in a manner being connected to the user who has been authenticated. On this occasion, the connecting procedure is also stored in a manner being connected to the user, and descriptions of how far the processing has progressed, and which image is being subjected to the connection processing are included in the connecting procedure. Then, the CPU 211 determines an instruction to connect the stored images together (804). The instruction is to connect the images stored in 801, 802, and 803 together into one image. Finally, the CPU 211 determines an instruction to perform post-processing (performed by the transmission server 104 in the present embodiment) on the image obtained by the connection processing. This is the same as post-processing in each process definition file (FIG. 6: 812, 822, and 832, FIG. 3: 505).

FIG. 7 is a diagram showing exemplary descriptions of a process definition file for the connecting procedure determined in the step S608. A reference numeral 901 denotes a process ID that uniquely identifies a newly-generated connecting process ("1001" in the example shown in FIG. 7). Reference numerals 902, 903, and 904 denote process IDs that are assigned to the respective selected process definition files ("0001", "0002", and "0003" in the example shown in FIG. 7), and indicate that reading processing, image processing, and so on are to be performed in accordance with the corresponding process definition files. Reference numerals 914, 915, and 916 denote types of image processing; the reference numeral 914 indicates that a character-searchable PDF is to be created by performing OCR processing, and the reference numeral 915 indicates that a highly-compressed PDF with a small image data size is to be created. Reference numerals 905, 906, and 907 indicate that instructions to store images generated in the respective processes (902, 903, and 904) in the HDD 314 in a manner being connected to the user are to be issued. Specifically, a location at which an image is to be stored, an image file name (908), and so on are described. Reference numerals 909, 910, and 911 indicate whether or not each process has been completed (whether or not each process has been completed up to the storage of the image). When the process has not yet been completed, "false" is written, and when the process has been completed, "true" is written. The CPU 211 updates this as the processing proceeds, thus determining what type of processing is to be performed next, and determining whether or not to carry out the combining process in 912. A reference numeral 912 indicates that an instruction to connect a plurality of images generated through the processes (902, 903, and 904) is to be issued. A reference numeral 913 describes post-processing (performed by the transmission server 104 in the present embodiment) on an image obtained as a result of the connecting processing. The process definition files for the connecting procedure may directly describe all the processes, and in the connecting procedure, it is simply written that the process IDs (902, 903, and 904) are referred to. The actual processing contents may be described in process definition files (for example, FIG. 3) corresponding to the respective process IDs.

Referring again to the flow in FIG. 4B, in the next step S609, the CPU 211 instructs the user to scan an original according to the connecting procedure determined in the step S608.

Figure 8A:
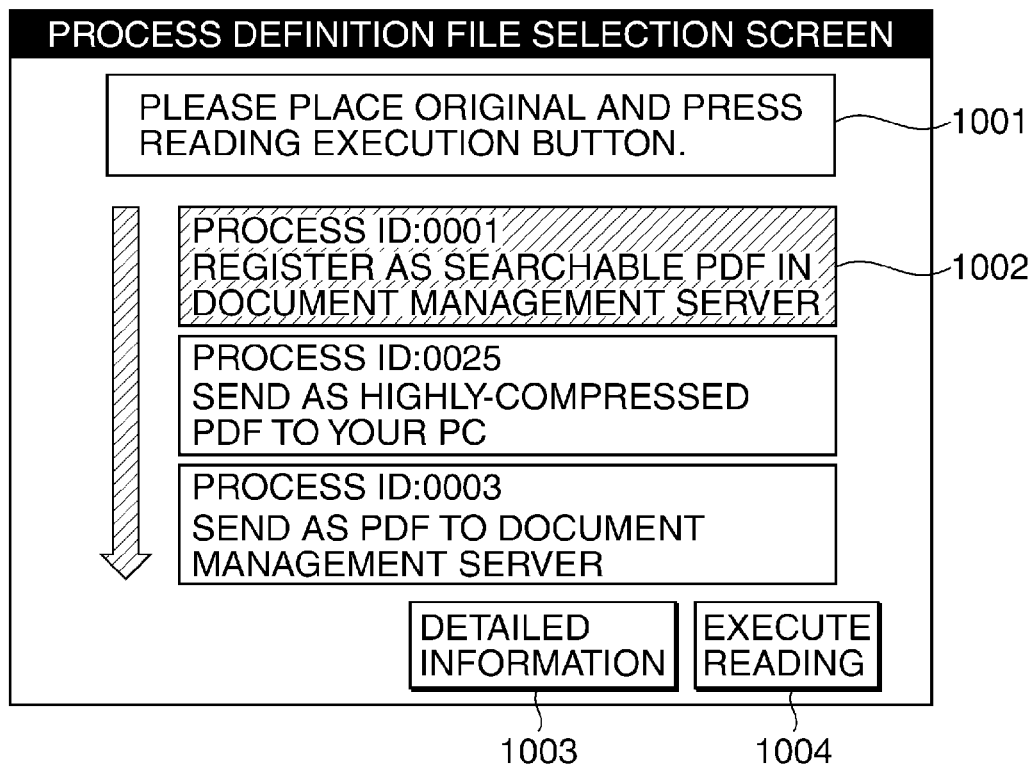
FIGS. 8A and 8B are diagrams showing an exemplary screen used in the first embodiment and operations performed by a transmission server.

FIG. 8A is a screen view showing an exemplary definition file execution screen (an execution instruction unit) displayed on the MFP 103 so as to instruct the user to scan an original.

On the screen in FIG. 8A, a message prompting the user to carry out reading is displayed at 1001, and the order in which processes are to be performed, and brief descriptions of the processes are displayed at 1002, where the process which is now going to be performed is highlighted. In the example shown in FIG. 8A, the process which is now going to be performed is a process with a process ID "0001". The display is changed as the processing proceeds.

Referring to FIG. 8A, after the currently-highlighted process with the process ID "0001" is completed, a process ID "0025" is highlighted when reading processing is performed next time. A detailed information button 1003 is a button for displaying detailed information on processing that is now going to be performed. When the detailed information button 1003 is depressed, settings of the reading processing that is now going to be performed, the type of image processing, and so on are displayed. A reading execution button 1004 is a button for starting execution of processing with an applicable process ID. When the reading execution button 1004 is depressed, reading processing for the applicable process ID is started according to the connecting procedure described above.

Referring again to the flow in FIG. 4B, in the next step S610, the CPU 211 causes the scanner 221 to perform the reading processing according to the determined connecting procedure, and generate image data consistent with definitions described in the connecting procedure.

Next, in step S611, the CPU 211 performs image processing on an image generated according to the connecting procedure. Then, the CPU 211 stores the image subjected to the image processing in a manner being connected to the user. Upon completion of the storage, the CPU 211 describes in the connecting procedure that the applicable process has been completed up to the storage of the image (909, 910, and 911 in the example shown in FIG. 7). At this time, the connecting procedure is stored in a manner being connected to the user.

Next, in step S612, the CPU 211 determines whether or not all images have been stored through the connecting procedure (determined at 909, 910, and 911 in the example shown in FIG. 7). Here, when all images have not yet been stored ("false" at any of 909, 910, and 911 in the example shown in FIG. 7), the CPU 211 returns to the step S609, in which the CPU 211 instructs the user to perform reading again in the next processing according to the connecting procedure. When it is determined in the step S612 that all images have been stored ("true" at all of 909, 910, and 911 in the example shown in FIG. 7), the CPU 211 proceeds to step S613.

Then, in the step S613, the CPU 211 takes all images applicable to the connecting processing stored in the HDD 314 (in the example shown in FIG. 7, images generated, processed, and stored at 902, 903, and 904), and connecting them together into one image according to the connecting procedure.

In step S614, the CPU 211 performs post-processing on the image obtained by the connecting processing in the step S613. In the present embodiment, one piece of image data and the connecting procedure are associated with each other and transmitted to the transmission server 104, and the transmission server 104 having received them performs the post-processing (913 in the example shown in FIG. 7).

Figure 8B:
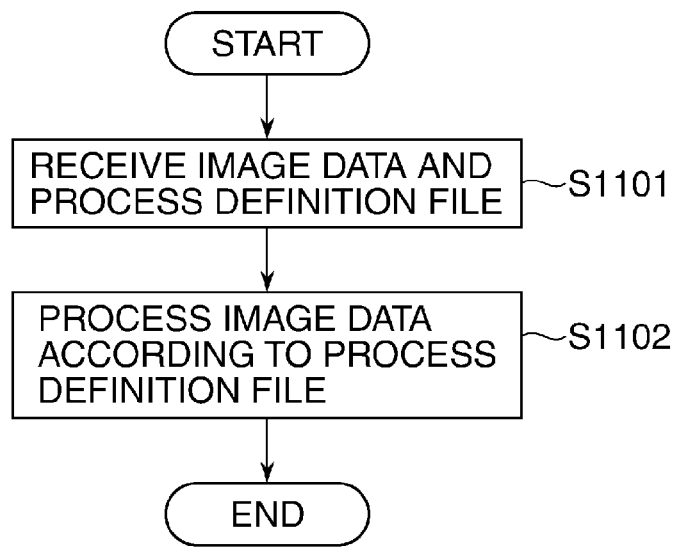

FIG. 8B is a flowchart of operations performed by the transmission server 104 according to the present embodiment, and shows operations performed by the transmission server 104 in a case where the MFP 103 requests the transmission server 104 to transmit image data. The operations in the flowchart of FIG. 8B are realized by the CPU 311 of the transmission server 104 executing control programs.

First, in step S1101, the CPU 311 receives image data to be processed and a process definition file from the MFP 103. Then, in step S1102, the CPU 311 analyzes a description in the process definition file received together with the image data in the step S1101, and performs processing on the image data according to a definition described in the process definition file. For example, when the definition described in the process definition file is registration in a document management server (£¥AAA.BBB.CCC), the CPU 311 transmits and registers the received image data to and in the document management server (¥¥AAA.BBB.CCC).

According to the first embodiment, a plurality of independent process definition files can be selected at a time. When an instruction to combine a plurality of documents into one is issued with the plurality of process definition files selected, images generated according to respective definitions in the selected plurality of process definition files are connected together, so that they can be processed as one document by the transmission server 104. Because in such a connecting process, independent process definition files can be used, the connecting process can be realized without the need for complicated operations.

Next, a description will be given of a second embodiment of the present invention.

In the first embodiment, the MFP 103 performs processing based on a plurality of process definition files, connects a plurality of documents into one document, and transmits a resultant image to the transmission server 104, which in turn performs post-processing on the image. On the other hand, in the second embodiment, when a plurality of process definition files are to be selected, only process definition files that can be connected together are allowed to be selected.

Further, there are not the administrator PC 101, the file management server 102, and the transmission server 104, but there is only the MFP 103. In this case, process definition files are created and edited through the console 219 of the MFP 103, process definition files are held in the HDD 314 of the MFP 103, and all processes described in process definition files are performed by the MFP 103.

Next, a description will be given of operations in the second embodiment with reference to FIGS. 9A, 9B, and 10.

Figure 9A:
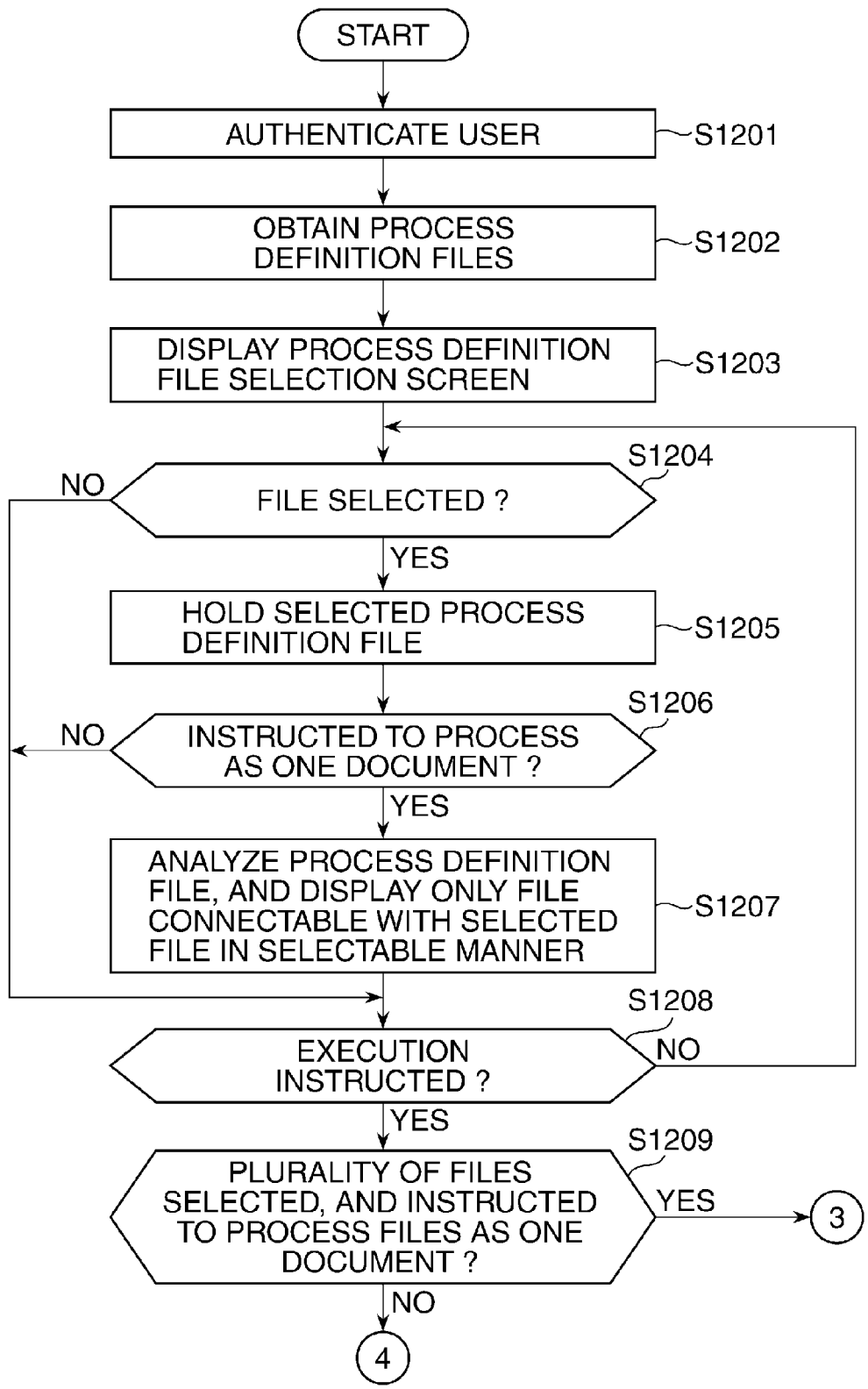
FIGS. 9A and 9B are flowcharts useful in explaining operations performed by an MFP according a second embodiment.
Figure 9B:
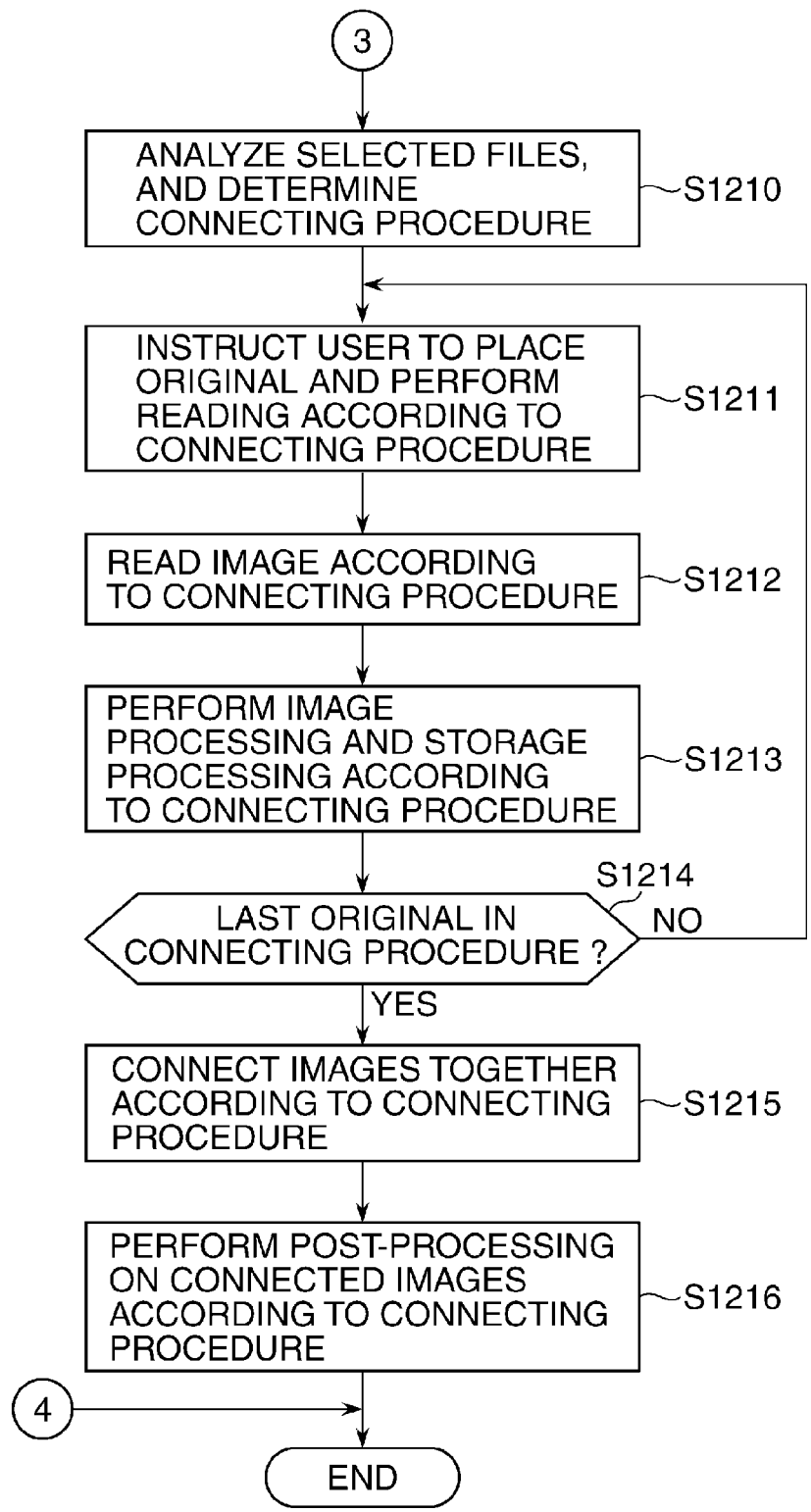
Figure 10:
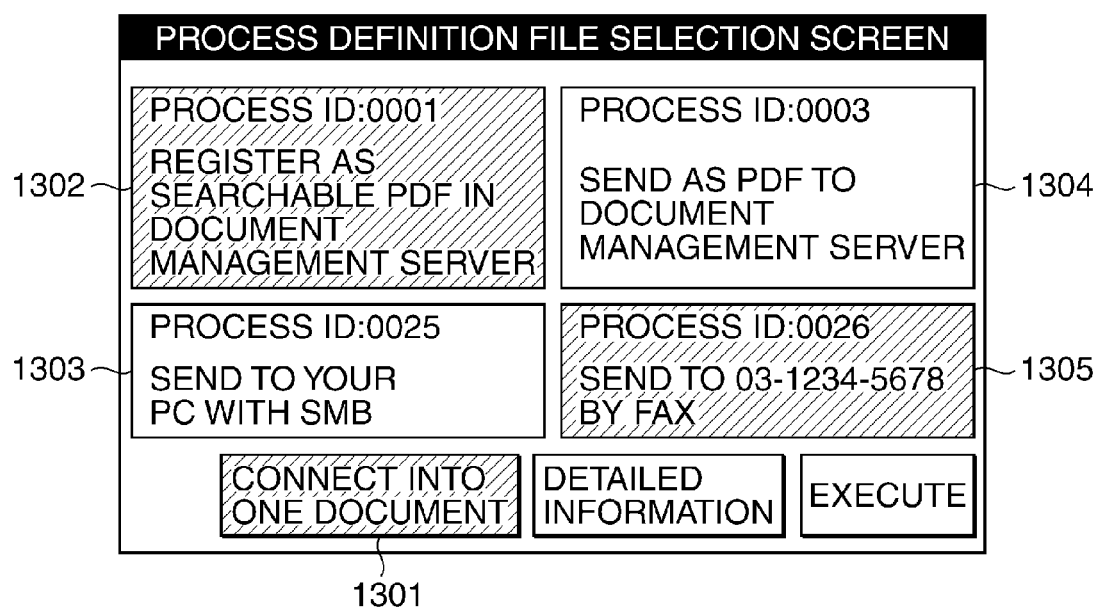
FIG. 10 is a view showing an exemplary screen used in the present embodiment.

FIGS. 9A and 9B are flowcharts of operations performed by the MFP 103 in the second embodiment, and shows a series of operations in which the MFP 103 generates and processes image data according to a selected process definition file. The operations in the flowchart of FIGS. 9A and 9B are realized by the CPU 211 of the MFP 103 executing control programs. FIG. 10 is a screen view showing a definition file selection screen displayed on the MFP 103 in the present embodiment.

It should be noted that steps S1201 to S1203 and steps S1208 to S1215 are similar to the corresponding steps described above with reference to the flowcharts of FIGS. 4A and 4B, and therefore, description thereof is omitted.

When it is determined in step S1204 that a process definition file has been selected, the CPU 211 holds the selected process definition file in step S1205, and proceeds to step S1206.

In the step S1206, the CPU 211 determines whether or not an instruction to process a plurality of documents as one document has been issued. In the exemplary screen shown in FIG. 10, a "connect into one document" button 1301 is depressed, and it is thus determined that the above instruction has been issued. When it is determined that the above instruction has not been issued, the CPU 211 proceeds to the step S1208. When it is determined that the above instruction has been issued, the CPU 211 proceeds to step S1207.

In the step S1207, the CPU 211 analyzes all the process definition files obtained in the step S1202, and displays only those connectable with the process definition file selected in the step S1204 as selectable process definition files. In the exemplary screen shown in FIG. 10, the process definition file 1302 is selected. When an image format of an image to be generated according to the process definition file 1302 is PDF, the CPU 211 allows only process definition files that generate images in the same image format, i.e., PDF to be selected (1303 and 1304), and inhibits process definition files that do not generate PDF images from being selected (1305). The condition for allowing process definition files to be selected is not limited to this, but for example, only process definition files defining the same post-processing (812, 822, and 832 in the example shown in FIG. 6) may be allowed to be selected.

In step S1216, the CPU 211 performs post-processing (812, 822, and 832 in the example shown in FIG. 6, and 913 in the example shown in FIG. 7) on an image obtained by the connecting process according to the connecting procedure. In the first embodiment, the transmission server 104 performs the actual post-processing, but in the present embodiment, the MFP 103 performs the actual post-processing.

In the second embodiment in which there is only the MFP 103, the same effects as those in the first embodiment described above can be obtained. Moreover, when a plurality of process definition files are to be selected, only connectable process definition files are allowed to be selected, and thus operability for the user can be improved.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-129933 filed Jun. 7, 2010, which is hereby incorporated by reference herein in its entirety.

What is claimed is:

1. An image processing system, comprising:
a reading unit configured to read an image on an original to generate image data based on the read image;
a performing unit configured to perform processing according to a process definition file defining reading processing to be performed by said reading unit and transmission processing for the image data generated from the reading processing;
a selection unit configured to select a first process definition file and a second process definition file;
a creation unit configured to create a third process definition file based on the first process definition file and the second process definition file selected by the selection unit, the creation unit configured to create the third process definition file by determining an order in which the first process definition file and the second process definition file are to be processed, and determining a content of the first process definition file and the second process definition file to perform: reading processing to be performed by the reading unit, image processing on image data generated by the reading unit, image storage processing in which image data is stored after image processing, image connection processing in which a plurality of pieces of image data stored in accordance with the image storage processing are connected together into one document, and post-processing on image data connected together in accordance with the image connection processing; and
a control unit configured to cause said performing unit to perform processing according to the third process definition file including: performing first reading processing defined according to the first process definition file and second reading processing defined according to the second process definition file, then to combine a plurality of image data generated from the first and second reading processings into one document, and to perform transmitting processing defined according to the first process definition file and the second process definition file on the combined image data, the second process definition file defining the second reading processing differently than the first reading processing according to the first process definition file and defining the transmitting processing according to the second process definition file the same as the transmitting processing according to the first process definition file.

2. The image processing system according to claim 1, wherein image processing to be performed on the plurality of image data generated from the first and second reading processings is further defined in the first process definition file and the second process definition file.

3. The image processing system according to claim 1, wherein the transmitting processing defined in the first process definition file and the second process definition file includes registering the combined image data in a document management server.

4. The image processing system according to claim 1, further comprising a receiving unit configured to receive from a user a starting instruction for the first reading processing and a starting instruction for the second reading processing, individually of each other.

5. An image processing system, comprising:
a reader configured to read an image on an original to generate image data based on the read image;
a processing device system comprising a processing device and communicatively connected to the reader; and
a memory device system communicatively connected to the processing device system and comprising one or more non-transitory memory devices, the memory device system storing, in at least one of the one or more non-transitory memory devices, at least one program executable by at least the processing device of the processing device system, the program comprising:

a performer module configured to perform processing according to a process definition file defining reading processing to be performed by said reader and transmission processing for the image data generated from the reading processing;

a selection module configured to select a first process definition file and a second process definition file;

a creation module configured to create a third process definition file based on the first process definition file and the second process definition file selected by the selection according to the selection module, the creation module configured to create the third process definition file by determining an order in which the first process definition file and the second process definition file are to be processed, and determine a content of the first process definition file and the second process definition file to perform: reading processing to be performed by the reader, image processing on image data generated by the reader, image storage processing in which image data is stored after image processing, image connection processing in which a plurality of pieces of image data stored in accordance with the image storage processing are connected together into one document, and post-processing on image data connected together in accordance with the image connection processing; and a controller module configured to cause said performer module to perform processing according to the third process definition file including: performing first reading processing defined according to the first process definition file and second reading processing defined according to the second process definition file, then to combine a plurality of image data generated from the first and second reading processings into one document, and to perform transmitting processing defined according to the first process definition file and the second process definition file on the combined image data, the second process definition file defining the second reading processing differently than the first reading processing according to the first process definition file and defining the transmitting processing according to the second process definition file the same as the transmitting processing according to the first process definition file.

6. A control method executed by an image processing apparatus that has a reading unit configured to read an image on an original to generate image data based on the read image, the control method comprising:

a performing step of performing processing according to a process definition file defining reading processing to be performed by said reading unit and transmission processing for the image data generated from the reading processing;

a selection step of selecting a first process definition file and a second process definition file;

a creation step of creating a third process definition file based on the first process definition file and the second process definition file selected in the selection step, the creation step creating the third process definition file by determining an order in which the first process definition file and the second process definition file are to be processed, and determining a content of the first process definition file and the second process definition file to perform: reading processing to be performed by the reading unit, image processing on image data generated by the reading unit, image storage processing in which image data is stored after image processing, image connection processing in which a plurality of pieces of image data stored in accordance with the image storage processing are connected together into one document, and post-processing on image data connected together in accordance with the image connection processing; and a control step of causing performance of processing according to the third process definition file including: performance of first reading processing defined according to the first process definition file and second reading processing defined according to the second process definition file, then combination of a plurality of image data generated from the first and second reading processings into one document, and performance of transmitting processing defined according to the first process definition file and the second process definition file on the combined image data, the second process definition file defining the second reading processing differently than the first reading processing according to the first process definition file and defining the transmitting processing according to the second process definition file the same as the transmitting processing according to the first process definition file.

7. The control method according to claim 6, wherein image processing to be performed on the plurality of image data generated from the first and second reading processings is further defined in the first process definition file and the second process definition file.

8. The control method according to claim 6, wherein the transmitting processing defined in the first process definition file and the second process definition file includes registering the combined image data in a document management server.

9. The control method according to claim 6, further comprising a receiving step of receiving from a user a starting instruction for the first reading processing and a starting instruction for the second reading processing, individually of each other.

10. One or more non-transitory computer-readable mediums storing a computer-executable control program for an image processing apparatus that has a reading unit configured to read an image on an original to generate image data based on the read image, the control program comprising:

a performer module configured to perform processing according to a process definition file defining reading processing to be performed by said reading unit and transmission processing for the image data generated from the reading processing;

a selection module configured to select a first process definition file and a second process definition file;

a creation module configured to create a third process definition file based on the first process definition file and the second process definition file selected by the selection according to the selection module, the creation module configured to create the third process definition file by determining an order in which the first process definition file and the second process definition file are to be processed, and determine a content of the first process definition file and the second process definition file to perform: reading processing to be performed by the reading unit, image processing on image data generated by the reading unit, image storage processing in which image data is stored after image processing, image connection processing in which a plurality of pieces of image data stored in accordance with the image storage processing are connected together into one document, and post-processing on image data connected together in accordance with the image connection processing; and a controller module configured to cause said performer module to perform processing according to the third process definition file including: performing first reading processing defined according to the first process definition file and second reading processing defined according to the second process definition file, then to combine a plurality of image data generated from the first and second reading processings into one document, and to perform transmitting processing defined according to the first process definition file and the second process definition file on the combined image data, the second process definition file defining the second reading processing differently than the first reading processing according to the first process definition file and defining the transmitting processing according to the second process definition file the same as the transmitting processing according to the first process definition file.

* * * * *